United States Patent [19]

Fletcher

[11] 3,929,644
[45] Dec. 30, 1975

[54] WATERCRAFT FOR SCAVENGING OIL SPILLAGE

[76] Inventor: George M. Fletcher, 456 Lee St., Oakland, Calif. 94610

[22] Filed: Dec. 28, 1970

[21] Appl. No.: 101,964

[52] U.S. Cl. .............................................. 210/242
[51] Int. Cl.² ......................................... E02B 15/04
[58] Field of Search............... 210/83, 242, DIG. 21; 114/183 A, 184, 185

[56] References Cited
UNITED STATES PATENTS

| | | | |
|---|---|---|---|
| 303,354 | 8/1884 | Woodward........................... | 114/185 |
| 931,633 | 8/1909 | Moore ................................ | 114/185 |
| 1,591,024 | 7/1926 | Dodge.............................. | 210/DIG. 21 |
| 2,713,840 | 7/1955 | Stigall ............................... | 114/185 |
| 2,876,903 | 3/1959 | Lee ................................ | 210/DIG. 21 |
| 3,219,190 | 11/1965 | Thune................................ | 210/242 |
| 3,578,171 | 5/1971 | Usher.............................. | 210/DIG. 21 |

*Primary Examiner*—Theodore A. Granger
*Attorney, Agent, or Firm*—Theodore J. Bielen, Jr.; Richard Esty Peterson

[57] ABSTRACT

A self-propelled watercraft for scavenging oil spillage and other floating debris from the surface of a body of water as, for example, oil accumulations and other debris that floats about harbor areas. The watercraft has a catamaran-type hull providing spaced apart hull sections each of which is equipped with a receiving tank having a substantial volume thereof extending downwardly below the surface of the water body. Each tank has an inlet located along and above a generally horizontal deck extending between the hull sections at the water level, and each tank also has an exit opening adjacent the bottom thereof which places it below the deck. The craft is open at its bow to define a mouth which permits a surface layer of the body of water to wash rearwardly along the deck toward the inlet opening of each tank as the craft is propelled through the water. Since the oil spillage and other debris is lighter than water and therefore floats, the volume of each receiving tank is effectively increased by removing the water accumulations that settle toward the bottom of the tank; and such removal of water is effected by reducing the pressure at the exit openings via a venturi flow passage system associated with the exit openings and which reduces the pressure thereat automatically as the craft moves through the water.

5 Claims, 4 Drawing Figures

INVENTOR:
GEORGE M. FLETCHER
BY: ATTORNEY

INVENTOR:
GEORGE M. FLETCHER
BY:
Joseph B. Gardner
ATTORNEY

WATERCRAFT FOR SCAVENGING OIL SPILLAGE

This invention relates to the art of removing or scavenging oil accumulations and other debris that floats along the surface of a body of water, and it relates more particularly to a watercraft which scavenges such debris as the craft is propelled through the water.

The problems attributable to the presence of large masses of oil slicks floating along the ocean surfaces has received considerable attention in recent years because of the subnatant oil leakages resulting from offshore oil wells and drillings therefor and also because of the rupture of large oil tankers used to transport oil from one land area to another. However, less dramatic oil spillage occurs daily in and about harbor areas, and such spillage also creates problems and difficulties which are best alleviated by removing or scavenging such spillage together with other floating debris. Although the present invention may be used in cleansing water bodies of large oil slicks, it is particularly suited for use in and about more restricted areas such as the harbor of any commercial port.

In view of the foregoing, a general object of the present invention is to provide an improved means for scavenging the surface of a body of water to remove oil and other floating debris therefrom. Another and more particular object of the present invention is in the provision of an improved watercraft adapted to be propelled about a body of water, and which craft is operative as it travels therealong to remove oil and other floating debris from the surface layer of such body of water and to accumulate such debris while returning substantial quantities of the cleaned water directly to the harbor, river, or other body of water through which the craft is propelled.

Further objects, among others, of the invention are that of providing an improved watercraft of the character described which collects in a receiving tank surface layers of the body of water through which the craft is propelled, and retains in such tank the lighter-weight floating debris but removes substantial quantities of the cleaned water from the tank for return to the body of water; in which the cleaned water is continuously removed from the tank by establishing a reduced pressure at the exit opening of such tank which is disposed well below the surface of the body of water; in which the reduced pressure at the exit opening of the receiving tank is created by locating such opening adjacent the reduced-pressure area of a venturi flow passage defined by transversely spaced and longitudinally extending wall surfaces of the hull of the watercraft; and in which such venturi flow passage is defined by a catamaran-type hull with which the improved watercraft is provided.

Additional objects and advantages of the invention, especially as concerns particular features and characteristics thereof, will become evident as the specification continues.

An embodiment of the invention is illustrated in the accompanying drawing, in which.

A boat or watercraft embodying the invention is illustrated in whole or in part in the various views of the accompanying drawing and is designated in its entirety with the numeral 10. The craft 10 has a buoyant hull 11 adapted to be propelled through or in a body of water, and the hull 11 has a catamaran configuration providing transversely spaced, longitudinally extending hull sections 12a and 12b. The craft is substantially symmetrical about the longitudinal center thereof, so that a detailed description of one side of the craft is adequate, it being understood that such description applies equally to the opposite or other half thereof. For purposes of simplification, the same numerals will be employed to designate the respectively corresponding components on opposite sides of the longitudinal center of the craft except that the suffixes "a" and "b" will be used in association with such numerals for purposes of differentiation. Also to simplify the subsequent description, the letter suffixes will be dropped or disregarded except where necessary or helpful to distinguish a component on one side of the craft from a like component on the opposite side thereof.

Figure 4:
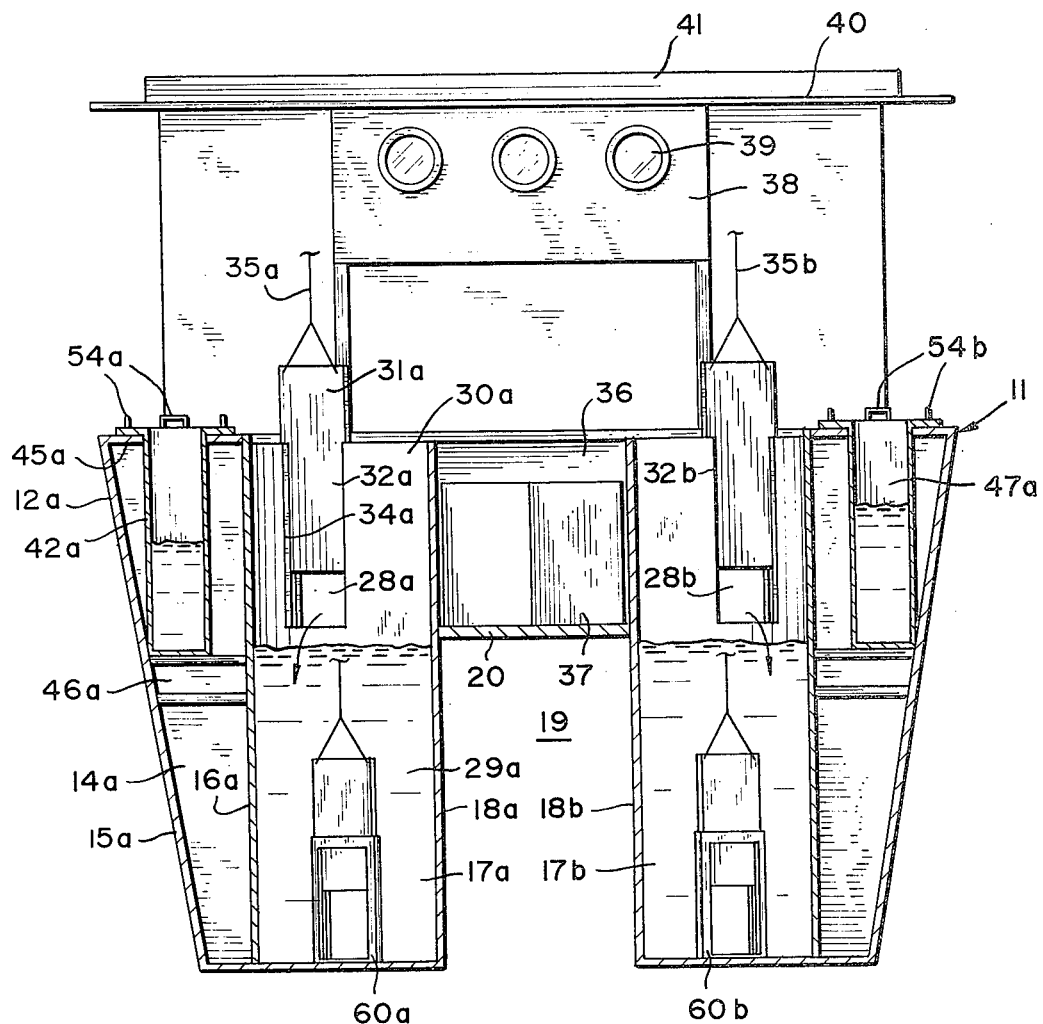
FIG. 4 is a transverse sectional view taken generally along the line 4—4 of FIG. 3.

The hull 11 and sections 12 thereof may have the usual or any other helpful curvatures along the water-engaging surfaces thereof, but since such matters are well known and commonly understood in marine or watercraft design, they are mainly disregarded herein because they are non-contributive to the inventive concepts explained. In this reference, the hull section 12a is illustrated in FIG. 4, and by reference thereto it will be observed that the hull section has a generally hollow interior 14 which gives the requisite volume to weight displacement to establish buoyancy. The outer wall 15 of the hull section slopes downwardly and inwardly such that the hull section has a significantly reduced transverse width at its lower end. The inner wall 16 of the hull section is more upright and generally vertical, and it forms one of the walls of a receiving tank 17 that extends substantially from top to bottom of the hull section 12 but may be somewhat shorter in vertical dimension, as illustrated.

Figure 1:
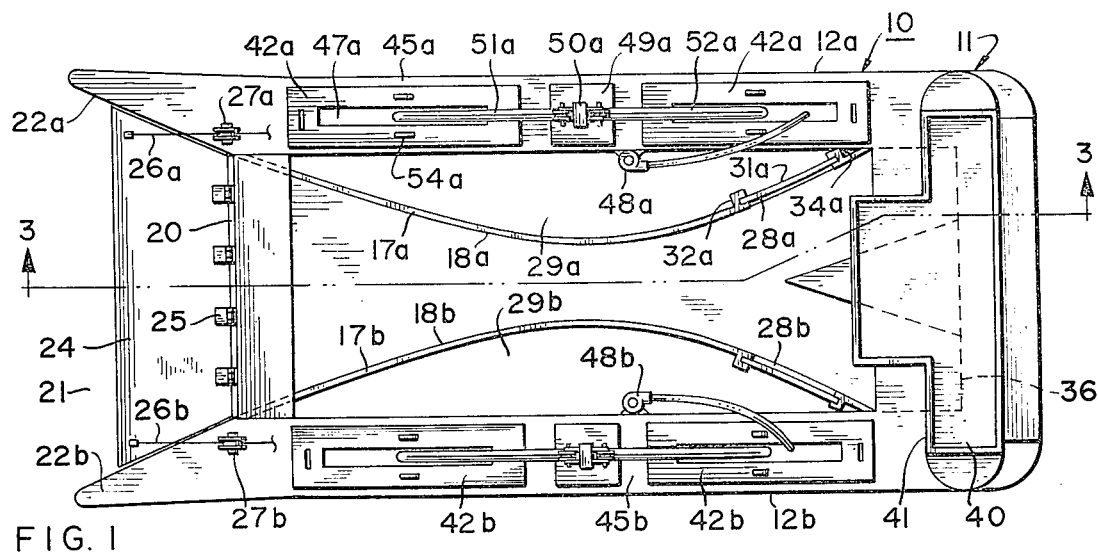
FIG. 1 is a top plan view of a watercraft embodying the invention.

As shown most clearly in FIG. 1, the tank 17 is quite long in its longitudinal dimension and extends substantially from end-to-end of the craft and hull sections 12 thereof. However, the tank 17 has a somewhat arcuate configuration along it inner surface 18 so that the two tanks 17 have wall surfaces defining a varying cross section therebetween of converging-diverging configuration establishing a venturi flow passage generally denoted in FIGS. 2 and 4 with the numeral 19. This particular configuration, as will become evident hereinafter, is of a special significance along the lower extremities of the tanks 17 and which lower extremities generally located below a deck 20 which is horizontally disposed and extends transversely between the hull sections 12 and, in more particular terms, between the tanks 17 respectively provided along the inner portions thereof.

Figure 3:
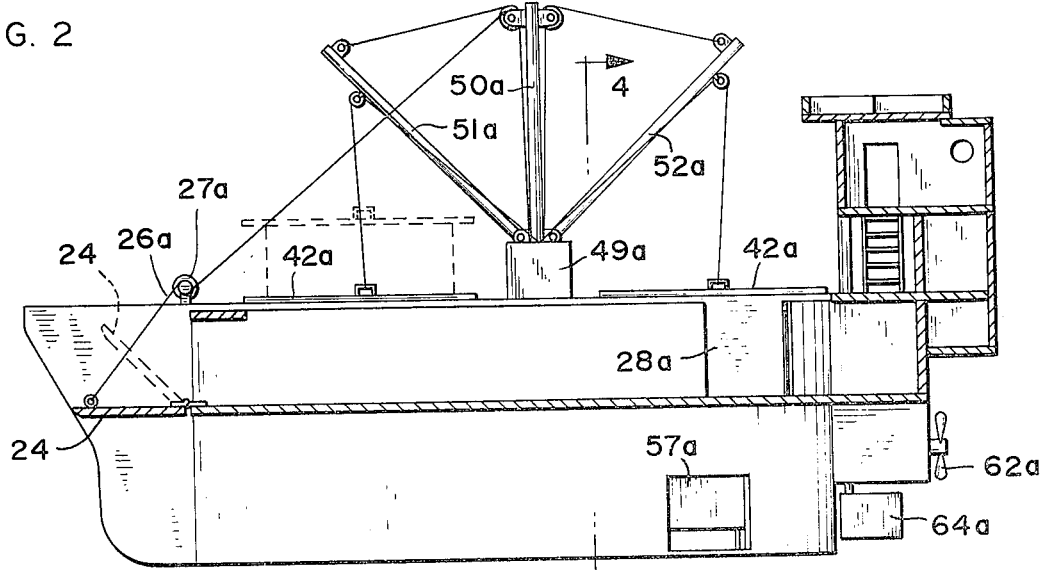
FIG. 3 is a longitudinal sectional view taken generally along the 3—3 of FIG. 1.

The deck 20 is located with reference to the draft of the craft 10 so that it lies generally along the surface layer of a body of water in which the craft is located so that the upper surface of the deck is washed with such upper layer. Along its upper surface, the deck 20 forms a part of an inlet system that communicates with each of the tanks 17 so as to deliver thereto portions of the surface layer of the water flowing over the deck. In this respect, the inlet system has a relative large mouth 21 at the bow of the craft defined in part by outwardly and forwardly diverging end portions 22a and 22b of the respective hull sections 12a and 12b. The mouth 21 can be selectively closed by a ramp or gate 24 pivotally secured to the deck 20 by a plurality of hinges 25 or comparable hinge structure. The closure ramp 24 is shown by full lines in FIG. 3 in its open position, and it can be swung upwardly into a closed position by manipulation of a pulley system that includes lines 26 secured to the ramp and pulley sheaves 27 about which the lines are entrained.

The inlet system further includes an inlet opening 28 provided by each tank 17 along the wall portion thereof extending above the deck 20 and adjacent thereto so that water flowing along the deck will spill into the tanks through the inlet openings thereof. Each tank 17 has a large chamber 29 defined therewithin which is open at its top, as shown at 30 in FIG. 4, although this is not essential and a cover or closure may be provided for each tank. The inlet opening 28 is provided with a closure or door 31 that may be located along the inner surface of the tank wall 18 and is supported for sliding movements with respect thereto between open and closed positions by guides 32 and 34. As illustrated in FIG. 4, a pulley system (only the cable 35 of which is illustrated) is connected with the gate 31 for purposes of elevating the same into the open position shown, the weight of the closure being adequate to displace the same into its closed position when permitted by the pulley system.

The inlet system adjacent the stern of the craft 10 is closed by an end wall 36 which prevents water flowing inwardly along the deck 20 through the open mouth 21 from leaving the deck except via the inlet opening 28 communicating with the interiors 29 of the receiving tanks (disregarding any reverse flow of water outwardly through the mouth 21). For purposes of dividing the inward flow of surface water along the deck 20, and for directing the same toward the respective openings 28, a triangularly shaped guide 37 extends forwardly from the rear wall 36 with the restricted apex of the triangle most remote from the wall. Disposed above the guide 37 is a bridge or compartment 38 within which are located the various controls necessary for operation of the craft, and the compartment may be equipped with the usual windows or portholes 39 to afford visual observation. If desired, a walkway or observation deck 40 may be located above the cabin 38, and a suitable railing 41 may border the deck 40, as illustrated in both FIGS. 1 and 4.

Supported within the hull sections 12 are a plurality of removable containers 42, there being two such containers illustrated in association with each hull section. For purposes of the present invention, all of the containers 42 may be identical although containers of varying size and capacity can be used. As illustrated best in FIG. 4, each container 42 has a perimetric flange 44 that seats upon the upper surface of the top wall 45 of the hull section 12, and the container extends downwardly through an opening therefor in such top wall 45 and along its bottom may seat upon one or more transverse supports 46 provided for this purpose within the hollow interior 14 of the hull section. Each container 42 defines a relatively large chamber 47 therewithin which is adapted to receive scavenged oil and similar debris from the chamber 29 of the associated receiving tank.

In this respect, a pump system is included for transferring such liquids from the tanks 17 to the containers 42, and the exemplary system illustrated in FIG. 1 includes pumps 48a and 48b respectively disposed along the hull decks 45a and 45b and having inlet hoses extending into the respectively associated tank chamber 29 and outlet hoses for respective disposition in the chambers 47 of the containers 42. It will be appreciated that the presence of the containers 42 effectively increases the capacity of the tanks 17 by removing scavenged debris therefrom via the pumps 48.

Further, the effective capacities of the tanks 17 are further increased by the removability of the containers 42 which permits removal of filled containers from the craft 10 and replacement with empty containers. For this purpose, the craft 10 may be equipped with a crane system for removing containers 42 and for replacing the same, and the exemplary crane system shown in FIGS. 1 and 4 may be completely conventional and includes a base 49 supported upon the deck 45, a standard 50 extending upwardly therefrom, and outwardly and upwardly extending booms 51 and 52 respectively equipped with a cable and pulley system adapted to be connected to a plurality of eyes 54 provided by each container so as to enable the container to be elevated and removed from the storage position shown in FIG. 4 and swung outwardly from the craft 10 for placement within a barge or other receiving vessel. Such container is then replaced with an empty container so that further accumulations can be removed from the tanks 17. As indicated in FIGS. 1 and 4, the crane apparatus and pulley systems thereof may include the usual cables 55 and sheaves or pulley wheels 56 located adjacent the upper end of the standard 50.

Figure 2:
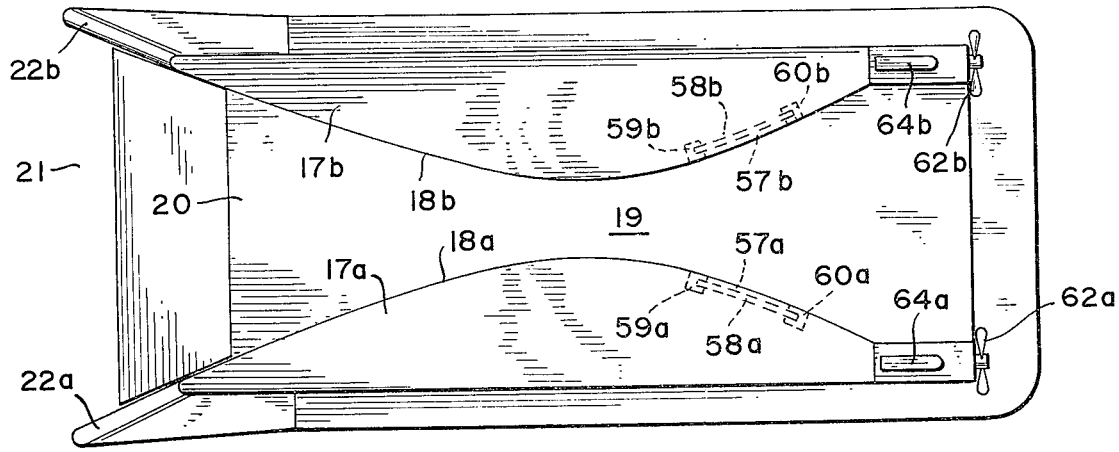
FIG. 2 is a bottom plan view of the watercraft.

Considering now the components of the craft 10 located beneath the deck 20 thereof and the aforementioned discharge system and its flow passage 19, reference will made in particular to FIG. 2. Such discharge system includes an exit opening 57 associated with each of the tanks 17. The openings 57 are located adjacent a lower-pressure area of the flow passage 19 and, in more particular terms, rearwardly of the most restricted area thereof. Each exit opening 57 is equipped with a gate or closure 58 slidably displaceable along the inner wall 18 of the associated tank between open and closed positions, being supported for such displacements by guides 59 and 60. As indicated in FIG. 4, a pulley system 61 is associated with each of the gates 58 and is effective to displace the same upwardly into their open position, the weight of each gate being adequate in the usual case to move each gate into its closed position when permitted by the associated pulley system.

The discharge system and exit openings 57 thereof function to remove liquid and especially cleaned water from the tanks 17, and removal is effected by establishing a pressure differential between the inlet system for the tanks and the exit openings thereof such that the inferior pressure of the differential is at the exit openings. In more particular terms, such pressure differential is created by reducing the pressure at the exit openings 57, and such reduction is accomplished by locating the same at the lower-pressure areas of the converging-diverging passage 19 which demonstrates the well known venturi principles as the craft 10 is propelled through a body of water. That is to say, as the craft 10 advances through a body of water, an inward flow of water is forced into the enlarged leading section of the passage 19, and as the passage converges toward its minimum dimension, the velocity of the water necessarily increases, thereby reducing the pressure in proportion to the change in velocity since pressure is an inverse function of velocity. Accordingly, the reduced pressure created adjacent the exit openings 57 causes water to flow outwardly or be aspirated from the tanks 17.

The craft 10 may be self-powered and can be propelled by any standard and conventional means as, for example, engine-driven propellers 62 respectively associated with the catamaran hull sections 12a and 12b. Similarly, any standard arrangement may be used to control the direction of movement of the craft 10 such rudders 64 respectively associated with the hull sections 12a and 12b. It will be appreciated that the controls for the engine (not shown) and for manipulating the rudders 64 will be of usual design and function and located within the compartment 38.

The tanks 17 have relatively large chambers 29 so as to provide a sufficiently long retention period for the admixture of water and oil admitted thereinto that the oil and water separate, the oil rising in the tank and the cleaned or oil-free water settling downwardly therein. Accordingly, very little oil is withdrawn from the tanks through the exit openings 57 thereof, and because of the substantially continuous removal of cleaned water, the capacity of each tank 17 is significantly greater than it would be if the tanks were required to retain all of the water and oil delivered thereto by the inlet system. Since the inlet system takes in the surface layer of a body of water through which the craft 10 is propelled, considerable floating debris in addition to oil is delivered to the tanks 17. As a result, it is often convenient to place screens (not shown) in the tanks along which such debris can be collected, and advantageously such screens are removable so that they can be lifted from the tanks to facilitate removal of the solid debris from the screens.

In use of the craft 10, it is propelled through a body of water at a relatively slow speed as, for example, of the order of 5 knots per hours. The ramp 24 is lowered into its open position so that the surface layer of the body of water engaged by the open mouth 21 is forced rearwardly along the upper surface deck 20 toward the rear of the craft and into the chamber 29 of the tanks 17 through the inlet openings 28. The long retention time provided by the relatively large capacities of the tanks 17 and chambers 29 thereof permits the oil to rise or separate from the water so that cleaned water tends to occupy the lower extremities of the tanks and be withdrawn therefrom by the reduced pressures created at the exit openings 57 because of the aspirating effects of the flow passage 19. Thus, separated oil tends to accumulate or stratify in the upper portions of the tanks 17.

Whenever the tanks 17 are full or it is desired to interrupt or terminate the scavenging operation, the gates 31 can be closed to prevent admission of additional water and debris admixtures into the tanks. At the same time, it will be advantageous to close the gates 58 for the exit openings 57 so as to prevent further withdrawal of liquid from the tanks. Also, the ramp 24 may be elevated into its closed position to minimize if not totally prevent admission of further surface layers of the water onto the deck 20. Upon return to the dock, the tanks 17 can be unloaded to prepare the craft for further scavenging operations.

As an alternative, or in addition to the described procedure, oil accumulated in the upper portions of the tanks 17 may be removed therefrom as the craft is in operation and delivered into the containers 42 by means of the pumps 48, thereby significantly increasing the capacity of the craft to accumulate scavenged oil. The craft can then return to its dock for unloading after all of the containers 42 and the tanks 17 are filled with oil or, as an alternative, filled containers 42 may be removed from the craft and replaced with empty containers brought to the operating zone by barge or other vessel. In this way, the effective capacity of the craft 10 is made almost infinite.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. A watercraft for scavenging oil and other floating debris from the surface of a body of water, comprising: a buoyant hull adapted to be propelled in such body of water and being equipped with a receiving tank having a substantial volume thereof extending downwardly below the surface of such body of water; an inlet system communicating with said tank and having a mouth located along the surface of such body of water to afford ingress of a surface layer thereof and delivery of such surface layer into said tank; a discharge system providing an exit opening for said tank at an elevation substantially below the surface of such body of water; and transversely spaced and longitudinally extending wall surfaces provided by said hull and defining an open ended flow passage below the surface of such body of water having a varying transverse cross section constituting a venturi through which water is forced to flow as said craft is propelled, said exit opening being disposed adjacent a lower-pressure area of said flow passage whereby the pressure adjacent said exit opening is reduced as said craft moves through such body of water so as to remove water accumulations from the lower portions of said tank and thereby enable the same to receive their greater quantities of scavenged debris.

2. The watercraft of claim 1 in which said hull has a catamaran configuration providing spaced apart hull sections defining the aforesaid wall surfaces and venturi flow passage.

3. The watercraft of claim 2 in which a pair of the aforesaid receiving tanks are provided in respective association with said hull sections, each of said receiving tanks being in communication with said inlet system and each provided with an exit opening as aforesaid.

4. The watercraft of claim 2 in which said inlet system includes a generally horizontal main deck extending between said hull sections at an elevation slightly below the surface of such body of water so as to enable the surface layer thereof to wash over said deck, said mouth being located along said deck adjacent the bow of said craft, and said tank being provided with an inlet opening generally along said deck and extending upwardly therefrom to define the aforesaid communication of said tank with said inlet system, said exit opening being located below said deck.

5. The watercraft of claim 4 in which each of said exit openings, inlet openings, and mouth is equipped with a movable closure, and in which means are provided for selectively moving each of said closures between the open and closed positions thereof.

* * * * *